United States Patent
Nash

[15] 3,672,475

[45] June 27, 1972

[54] DASH POT INCLUDING TEMPERATURE SENSITIVE VALVE MEANS

[72] Inventor: Alan Richard Brine Nash, 39, Abbot's Ride, Farnham, Surrey, England

[22] Filed: July 7, 1970

[21] Appl. No.: 52,933

[30] Foreign Application Priority Data

July 7, 1969 Great Britain......................34,154/69

[52] U.S. Cl.............................................188/277, 188/306
[51] Int. Cl..............................................F16f 9/52
[58] Field of Search..........................188/276, 277, 306, 308

[56] References Cited

FOREIGN PATENTS OR APPLICATIONS 859,839  1/1961  Great Britain..........................188/276

*Primary Examiner*—George E. A. Halvosa
*Attorney*—Cameron, Kerkam & Sutton

[57] ABSTRACT

A dashpot or damper has means for compensating for changes of viscosity in the damping fluid due to changes of temperature. Restricted flow paths for the damping fluid that determine the damping force are composed in part of members that are displaceable with changes of temperature so that the cross-sectional areas of the flow paths vary at different temperatures and compensate at least partially for the concurrent fluid viscosity changes.

9 Claims, 2 Drawing Figures

DASH POT INCLUDING TEMPERATURE SENSITIVE VALVE MEANS

This invention relates to dashpots or dampers in which a damping member movable in a space containing a fluid has its motion resisted by the fluid to give a damping effect.

Such devices have their damping rate determined by the viscosity of the damping fluid, among other factors, and this will vary with temperature. In the absence of any provision for this variation therefore, it will generally be the case that the resistance to movement of the damping member will decrease with rise of temperature, which may lead to unwanted effects in many applications.

According to the invention, in a dashpot comprising a body providing at least one enclosed space in which a damping member is displaceable against the resistance afforded by a damping fluid therein, means are provided to control the damping rate by variation of the size of a flow route communicating with that space for fluid displaced by the member, said means comprising at least one device that is displaceable with change of temperature, the arrangement being such that variations in damping rate due to changes in viscosity of the damping fluid are reduced by the associated variation of the flow route cross-sectional area with temperature.

Preferably, said control device comprises a member that defines a boundary portion of said flow route and is angularly displaceable to expand and contract the cross-sectional area of said route. By use of an angularly displaceable arrangement in this manner, it is possible to obtain a mechanical advantage such that relatively small dimensional changes due to temperature differences are multiplied to give a greater translational movement of said boundary portion. Conveniently, the member may comprise end elements by which it is located on a mounting, the end elements being connected by an intermediate element pivotable relative to them, the spacing of the end elements being determined by said mounting whereby variations between the length of the member and said spacing with temperature changes causes movement of the intermediate member towards and away from the mounting.

In one form of the invention, the dashpot is arranged to be responsive to rotational movements, the damping member being angularly displaceable and conveniently having a plurality of vanes disposed symmetrically about its axis, each in an associated enclosed space, respective flow routes for the displaced fluid being provided between respective enclosed spaces. Thus, an angularly displaceable control device as referred to above can be incorporated in this arrangement by providing pivot mounting means for the end elements of each control device member in a radially outer region of the dashpot body so that the member projects across the radial space between said region of the dashpot body and the damping member, a clearance between the damping member and each control device member providing said flow routes between the enclosed spaces.

One embodiment of the invention will be more particularly described with reference to the accompanying drawing wherein.

Figure 1:
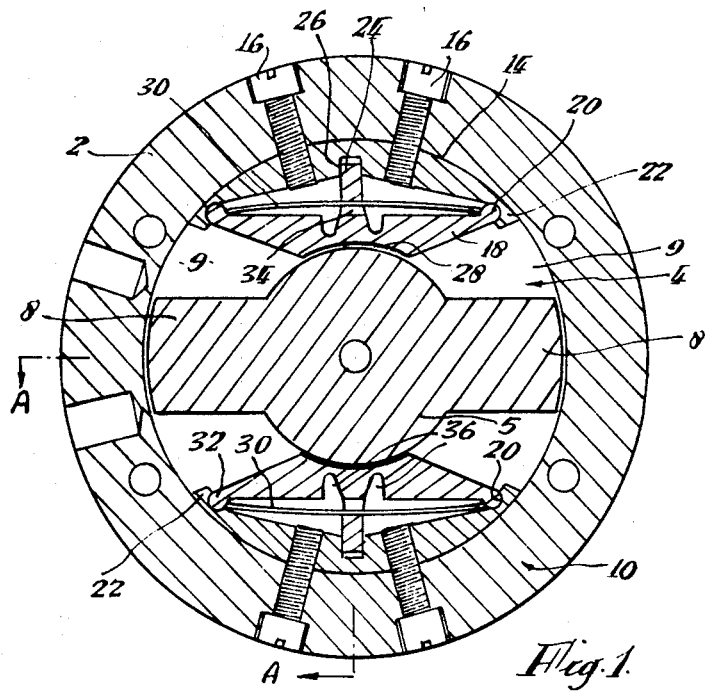
FIG. 1 is a plan section of a rotary dashpot according to the invention.
Figure 2:
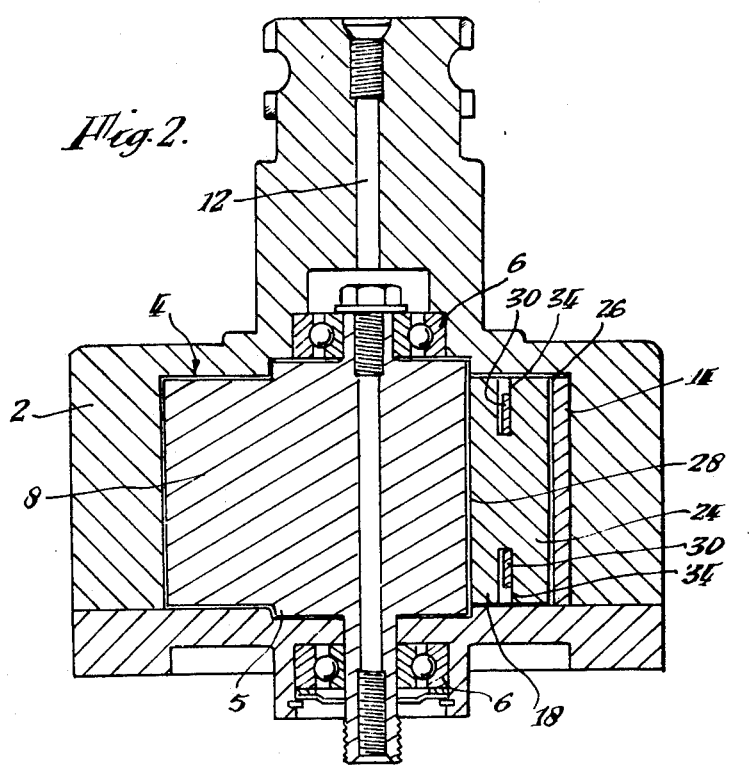
FIG. 2 is a sectional elevation on the line A — A in FIG. 1.

Referring to the drawing, the dashpot comprises a body 2 in which a damping member 4 is pivotally mounted by a central stem 5 on bearings 6. The member 4 has two diametrically opposed vanes 8, each in a separate enclosed space 9 of the body interior, the angular limits of which are defined by diametrically opposed control device assemblies 10. The body interior is filled with a damping fluid, a bleed passage 12 being provided to remove air, and relative rotation between the body 2 and member 4 is therefore resisted by the fluid which, as the free volumes on opposite sides of a vane 8 in each space 9 changes, will be forced to flow in each space 9 past the clearances between the body and the vanes and from each of the pair of spaces 9 of the body interior to the other through the clearances between the control devices 10 and the stem 5 of the damping member 4.

To reduce the effects of the smaller resistance to flow that will come from the lowering of the viscosity of the fluid with increased temperature, the control devices 10 are arranged to be displaceable with temperature changes so that a rise in temperature reduces the flow path cross-section between the opposed regions of the body interior.

Each device comprises a rigid mounting member 14 which is secured to the body by screws 16 but which may alternatively be integral with the body. A bridge 18, of a material such as nylon having a relatively high rate of thermal expansion, is mounted on the member 14 by opposed arcuate edge regions 20 that seat in complementary concave lips 22 at the lateral limits of the member 14, while a central web 24 of the bridge is a free fit in a groove 26 of the member 14. The radially inner face of the bridge has a central portion 28 of arcuate form complementary to the adjacent surface of the stem 5 of the damping member and this surface is urged radially outwards away from the stem by a pair of metallic leaf springs 30, the ends of which bear against shoulders 32 at the edge regions 20 of the bridge, the springs passing through respective slots 34 in the web 24 where they apply the radially deflecting force to the central portion of the bridge. At the same time, this radially acting force gives rise to reaction forces on the ends of the springs urging the edges of the bridge firmly into their seatings 22 of the mounting member 14.

Immediately adjacent the web 24, two recesses or reliefs 36 extend across the bridge parallel to the axis of the dashpot giving a considerably reduced thickness to the wall of the bridge on opposite sides of the web. It will be noted that the bridge is effectively pivoted at its ends through the arcuate seatings it has there while the reduced thicknesses at the reliefs 36 effectively form two further pivot joints between the central region of the portion 28 of the bridge and the opposed side portions extending from it at a small angle to said central region. If a change of temperature creates a relative difference between the length of the bridge and the spacing of its seatings on the mounting member, the difference is therefore taken up by movement of the bridge similarly to a pin-jointed unit, that is to say, if the bridge material has expanded more than the mounting member material the two side portions of the bridge will pivot inwards on their seatings 22 and displace the central region 28 closer to the stem 5, the arcuate contour of the inner face of the portion 28 being substantially unaltered.

It will be clear that this restricts the flow of fluid through the passage between the bridge and the stem. By matching this effect to the lowering of viscosity of the fluid that the temperature rise will also have caused, it can be arranged that the resulting resistance to flow is changed little if at all. If the normal spacing at the passages is relatively large (say 0.25 mm to 0.4 mm) compared with the clearances between the other relatively movable surfaces in the dashpot interior (which may be about 0.05 mm to 0.08 mm) the variation of cross-section produced by deflection of the bridges can have a controlling effect on the total resistance to flow of the dashpot fluid.

In the action of the dashpot, movement of the damping member 4 causing flow of fluid through the passages between the bridge 18 and the stem 5 will also give rise to asymmetrical fluid pressure forces on the bridge tending to displace the bridge side portions extending from each relief 36 so that they pivot on their supporting concave lips 22, one portion being subjected to an increased pressure urging it outwards and the other to a reduced pressure urging it inwards. The engagement of the central web 24 in the groove 26 inhibits the angular deflection of the central portion 28 that would otherwise result from these pressure forces, while at the same time it allows temperature responsive radial displacements of the central portion, so that the gap between the bridge and the damping member stem remains substantially uniform and the damping rate is not affected by these transient fluid pressure differences.

The characteristic of the cross-sectional area change with temperature will of course be determined partly by the relative expansion rates of the materials employed, Variation of the effective angular relationships of the pivot joints of the bridge will also give some control of this characteristic, however. Thus, for the illustrated example where a nylon bridge 18 is used in an aluminum mounting 14, the angle defined to a base line formed by the pivot centers of the two seatings 22 by the line joining either pivot center of the seatings 22 to the hinge center at its adjacent relief 36 can be about 19°.

What I claim is:

1. A dashpot comprising, in combination, a body, at least one enclosed space within said body, a damping fluid in said space, a damping member mounted in the body to be movable in said space against the resistance afforded by the damping fluid, a flow route being provided for the damping fluid displaced by movement of the damping member, a temperature-sensitive device comprising a control member defining a boundary portion of said flow route and a mounting on which the control member is displaceable to increase and reduce the cross-sectional area of said route, said control member comprising opposite end elements and an intermediate element interconnecting said end elements by regions of reduced thickness and being pivotable relatively thereto at said regions, the end elements being disposed at a small angle to the intermediate element, mutually remote regions of the end elements engaging the mounting pivotally and the spacing of said regions being determined thereby, variations between said spacing and the combined lengths of the elements of the control member with change of temperature causing pivoting of the end elements on the mounting and therewith pivoting of the intermediate element relative to the end elements to move the intermediate element towards and away from the mounting thereby varying the cross-sectional area of said flow route, the arrangement being such that variations in damping rate due to changes in viscosity of the damping fluid with changes of temperature are reduced by the associated variation of the flow route cross-sectional area.

2. A dashpot according to claim 1 including resilient means acting upon the mounting-engaging regions of the control member to maintain said regions in pivotal contact with the mounting.

3. A dashpot according to claim 1 wherein said end and intermediate elements are formed integrally in said control member, said regions of reduced thickness defining the junctions of the elements with each other.

4. A dashpot according to claim 1 further comprising resilient acting upon the control member to urge the intermediate element in a direction that provides an increased cross-sectional area for the flow route.

5. A dashpot according to claim 1 further comprising restraint means between the intermediate element and the mounting to prevent or limit pivoting of the intermediate element relative to said mounting.

6. A dashpot according to claim 5 wherein said restraint means comprises a location element carried by the control member, an element of the mounting providing a non-rotatable engagement for said location element, said location element being on or adjacent to said intermediate element and being slidable relative to said mounting element with movement of the intermediate element.

7. A dashpot according to claim 1 wherein the damping member comprises a pivot support on which it is angularly displaceable, and a plurality of vanes projecting symmetrically from the axis of rotation of the member, respective enclosed spaces being provided in the body for each of said vanes, respective flow routes for the displaced fluid being provided between the enclosed spaces.

8. A dashpot according to claim 7 wherein respective temperature-sensitive devices are provided between each of said enclosed spaces, each device comprising a control member that defines a boundary portion of the flow route between associated spaces and being displaceable to increase and reduce the cross-sectional area of said route, pivot mounting means for each control member being provided in a radially outer region of the dashpot body so that the member projects inwardly across the radial space between said region of the dashpot body and the damping member, a clearance between the camping member and each control member defining said flow routes between the enclosed spaces.

9. A dashpot according to claim 8 wherein clearances are provided between the vanes and the adjacent walls of the dashpot body, said clearances being arranged to be of substantially smaller cross-section than the clearances associated with said temperature-sensitive device flow routes.

* * * * *